United States Patent
Haj-Yihia et al.

(10) Patent No.: US 10,114,448 B2
(45) Date of Patent: Oct. 30, 2018

(54) AUTONOMOUS C-STATE ALGORITHM AND COMPUTATIONAL ENGINE ALIGNMENT FOR IMPROVED PROCESSOR POWER EFFICIENCY

(71) Applicant: Intel Corporation, Santa Clara, CA (US)

(72) Inventors: Jawad Haj-Yihia, Ha (IL); Eliezer Weissmann, Haifa (IL); Vijay S R Degalahal, Bangalore (IN); Nadav Shulman, Tel Mond (IL); Tal Kuzi, Tel Aviv (IL); Itay Franko, Folsom, CA (US); Amit Gur, Haifa (IL); Efraim Rotem, Haifa (IL)

(73) Assignee: Intel Corporation, Santa Clara, CA (US)

(*) Notice: Subject to any disclaimer, the term of this patent is extended or adjusted under 35 U.S.C. 154(b) by 393 days.

(21) Appl. No.: 14/322,185

(22) Filed: Jul. 2, 2014

(65) Prior Publication Data

US 2016/0004296 A1 Jan. 7, 2016

(51) Int. Cl.
*G06F 1/00* (2006.01)
*G06F 1/32* (2006.01)

(52) U.S. Cl.
CPC .......... *G06F 1/3287* (2013.01); *G06F 1/3243* (2013.01); *Y02D 10/152* (2018.01); *Y02D 10/171* (2018.01)

(58) Field of Classification Search
CPC ........ G06F 1/32; G06F 1/3203; G06F 1/3206; G06F 1/3234; G06F 2212/1028; G06F 2212/502
See application file for complete search history.

(56) References Cited

U.S. PATENT DOCUMENTS

| | | | | |
|---|---|---|---|---|
| 8,370,665 | B2* | 2/2013 | Gargash | G06F 1/3203 713/320 |
| 2005/0024927 | A1* | 2/2005 | Dolwin | G06F 1/3203 365/154 |
| 2009/0150696 | A1* | 6/2009 | Song | G06F 1/3203 713/323 |
| 2010/0083017 | A1* | 4/2010 | Fulkerson | G06F 1/3203 713/320 |

(Continued)

*Primary Examiner* — Thomas C Lee
*Assistant Examiner* — Zhipeng Wang
(74) *Attorney, Agent, or Firm* — Spectrum IP Law Group LLC (57) ABSTRACT

Methods and apparatus relating to autonomous C state mechanism and computational engine alignment for improved processor power efficiency. are described. An embodiment determines whether a semiconductor package should enter a package C state based on energy consumption values for entry into and exit from the package C state, an amount of time the semiconductor package stayed in the package C state previously, and one or more breakeven time points between the various package C states. Another embodiment detects a delay by an imaging computational unit of a processor to enter a low power consumption state relative to one or more other computational units of the processor. The logic causes the imaging computational unit to enter the low power consumption state in response to detection of the delay. Other embodiments are also disclosed and claimed.

22 Claims, 8 Drawing Sheets

(56) References Cited

U.S. PATENT DOCUMENTS

| | | | |
|---|---|---|---|
| 2011/0138197 A1* | 6/2011 | Lakshmanan | G06F 1/3203 713/300 |
| 2011/0145617 A1* | 6/2011 | Thomson | G06F 1/3203 713/323 |
| 2011/0161627 A1* | 6/2011 | Song | G06F 1/3203 712/30 |
| 2013/0151879 A1* | 6/2013 | Thomson | G06F 1/329 713/322 |
| 2014/0149772 A1* | 5/2014 | Arora | G06F 1/206 713/323 |
| 2015/0121057 A1* | 4/2015 | Arora | G06F 1/3228 713/100 |
| 2015/0121106 A1* | 4/2015 | Eckert | G06F 1/3228 713/323 |
| 2015/0198991 A1* | 7/2015 | Bircher | G06F 1/3243 713/323 |
| 2015/0268713 A1* | 9/2015 | Jain | G06F 1/3212 713/320 |

\* cited by examiner

AUTONOMOUS C-STATE ALGORITHM AND COMPUTATIONAL ENGINE ALIGNMENT FOR IMPROVED PROCESSOR POWER EFFICIENCY

FIELD

The present disclosure generally relates to the field of electronics. More particularly, an embodiment relates to autonomous C state mechanism and computational engine alignment for improved processor power efficiency.

BACKGROUND

To reduce power consumption, some systems include processors with the ability to perform at various low power (Cx) or idle states. Each C state may indicate a certain level of functionality and a corresponding power state. For example, C0 may indicate the processor is operating at normal levels, C1 may indicate the processor is not executing instructions but is able to return to an executing state quickly, etc.

However, as the need for more power efficient systems arises, e.g., to allow for all day operation using battery power from a single charge, such coarse power reduction solutions that are solely based on processor states may fall short.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

While the above discussed C states may apply to processors only, some embodiments are applied to semiconductor package level power consumption states (as well as at any level including a processor level, a device level, globally, etc.). More generally, some of the power consumption states may be in accordance with those defined under Advanced Configuration and Power Interface (ACPI) specification, Revision 5.0a, Nov. 13, 2013. Also, as will be further discussed herein, a (semiconductor) package or device may include a processor (e.g., with one or more processor cores). In some embodiments, the C states discussed herein is applied at package level, e.g., for a semiconductor package that includes one or more components such as those discussed herein with reference to FIGS. 1-8. Furthermore, a number of C states may be used. For example, variations of ACPI C2 and C3 states may include a "deep sleep" state (e.g., C6), a "deeper sleep" state (e.g., C7), etc.

Some embodiments relate to autonomous C state mechanism and computational engine alignment for improved processor power efficiency. An embodiment provides for autonomous handling of C state demotion and un-demotion, e.g., to yield a more accurate and/or more stable solution for energy efficiency. In one embodiment, the package C state that a system should enter is determined based on energy calculation(s) that take into account the energy which is to be consumed for entry and/or exit to/from that package C state, the time that the package stayed at the package C state last time, and one or more breakeven time points between the various package C states.

Furthermore, in many scenarios the imaging computational unit/logic (e.g., that performs graphics/imaging intensive operations) may need more time to finish their work relative to the other computational units/logic (such as general-purpose processor core that perform various general computations/arithmetic operations (also referred to herein as "IA") or graphics computational unit (also referred to herein as "GT")). For these scenarios, the imaging computational unit will keep the system up (e.g., sometimes for about 100 ms) as it is not aligned with the other (e.g., GT/IA) computational units. This means that the system will not enter into a lower power consumption package C state until the imaging logic/unit has finished its work. To this end, one embodiment utilizes a new mechanism that detects these scenarios and causes the imaging computational unit to race to (or otherwise as quickly as possible enter) an idle state (or low power consumption state). This raises the residency of low power package C state(s) and saves energy (e.g., battery life).

Figure 1:
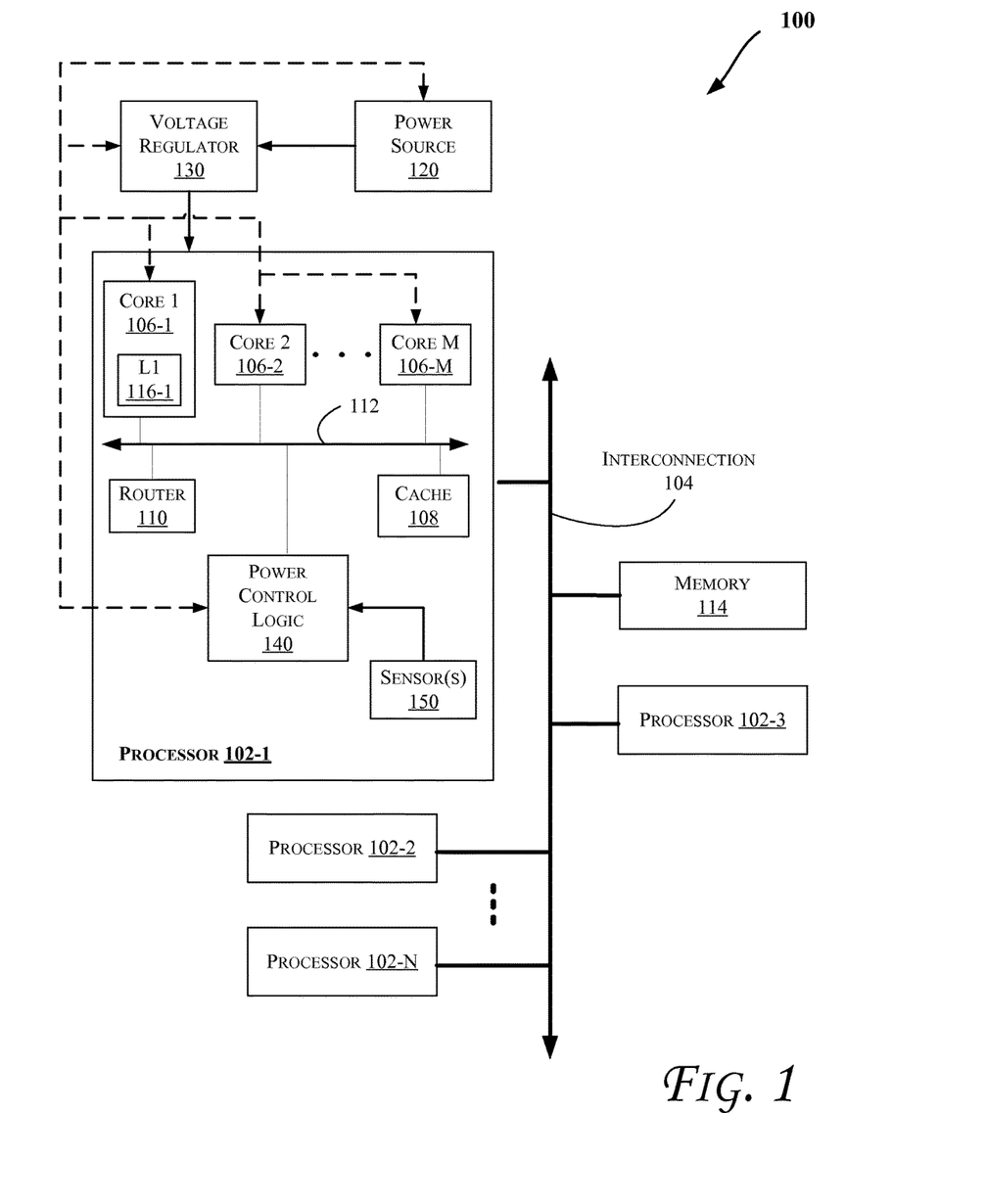
FIGS. 1 and 6-8 illustrate block diagrams of embodiments of computing systems, which may be utilized to implement various embodiments discussed herein.

Moreover, some embodiments may be applied in computing systems that include one or more processors (e.g., with one or more processor cores), such as those discussed with reference to FIGS. 1-8 including, including for example mobile computing devices such as a smartphone, tablet, UMPC (Ultra-Mobile Personal Computer), laptop computer, Ultrabook™ computing device, smart watch, smart glasses, wearable devices, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 includes one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 6-8), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a direct current (DC) power source or an alternating current (AC) power source) to provide power to one or more components of the system 100. The power source 120 could include a PV (Photo Voltaic) panel, wind generator, thermal generator water/hydro turbine, etc. In some embodiments, the power source 120 may include one or more battery packs (e.g., charged by one or more of a PV panel, wind generator, thermal generator water/hydro turbine, plug-in power supply (e.g., coupled to an AC power grid), etc.) and/or plug-in power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 to control the supply of power to and/or the power state of one or more components of the system 100 and/or one or more components discussed with reference to FIGS. 1-8. In an embodiment, logic 140 (or other logic in system 100 or coupled to system 100) causes a change to package C state, e.g., based on various determinations discussed herein and/or by instructing computational units of processor(s) 102 (such as GT/IA or imaging computational unit(s) of processor(s) 102) as discussed herein. Logic 140 may have access to one or more storage devices discussed herein (such as cache 108, L1 cache 116, memory 114, or another memory in system 100) to store information relating to operations of logic 140 such as information communicated with various components of system 100 as discussed herein. As shown, the logic 140 may be coupled to the VR 130 and/or other components of system 100 such as the cores 106 and/or the power source 120.

For example, the logic 140 may be coupled to receive information (e.g., in the form of one or more bits or signals) to indicate status of one or more sensors 150. The sensor(s) 150 may be provided proximate to components of system 100 (or other computing systems discussed herein such as those discussed with reference to other figures including 6-8, for example), such as the cores 106, interconnections 104 or 112, components outside of the processor 102, etc., to sense variations in various factors affecting power/thermal behavior of the system/platform, such as temperature, solar radiation, wind speed, water flow, operating frequency, operating voltage, power consumption, and/or inter-core communication activity, processing unit (e.g., IA/GT or imaging computational unit) status or workload, etc.

The logic 140 may in turn instruct the VR 130, power source 120, and/or individual components of system 100 (such as the cores 106 or GT/IA/imaging computational units in processors 102 or cores 106) to modify their operations. For example, logic 140 may indicate to the VR 130 and/or power source 120 (or PSU) to adjust their output. In some embodiments, logic 140 may request the cores 106 to modify their operating frequency, power consumption, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, outside of computing device/system (e.g., as a standalone device), coupled to (or integrated with) the power source 120, etc. Furthermore, as shown in FIG. 1, the power source 120 and/or the voltage regulator 130 may communicate with the power control logic 140 and report their power specification. Hence, in an embodiment, logic 140 is an intelligent power controller with voltage translation, under-power and over-voltage protections.

Figure 2:
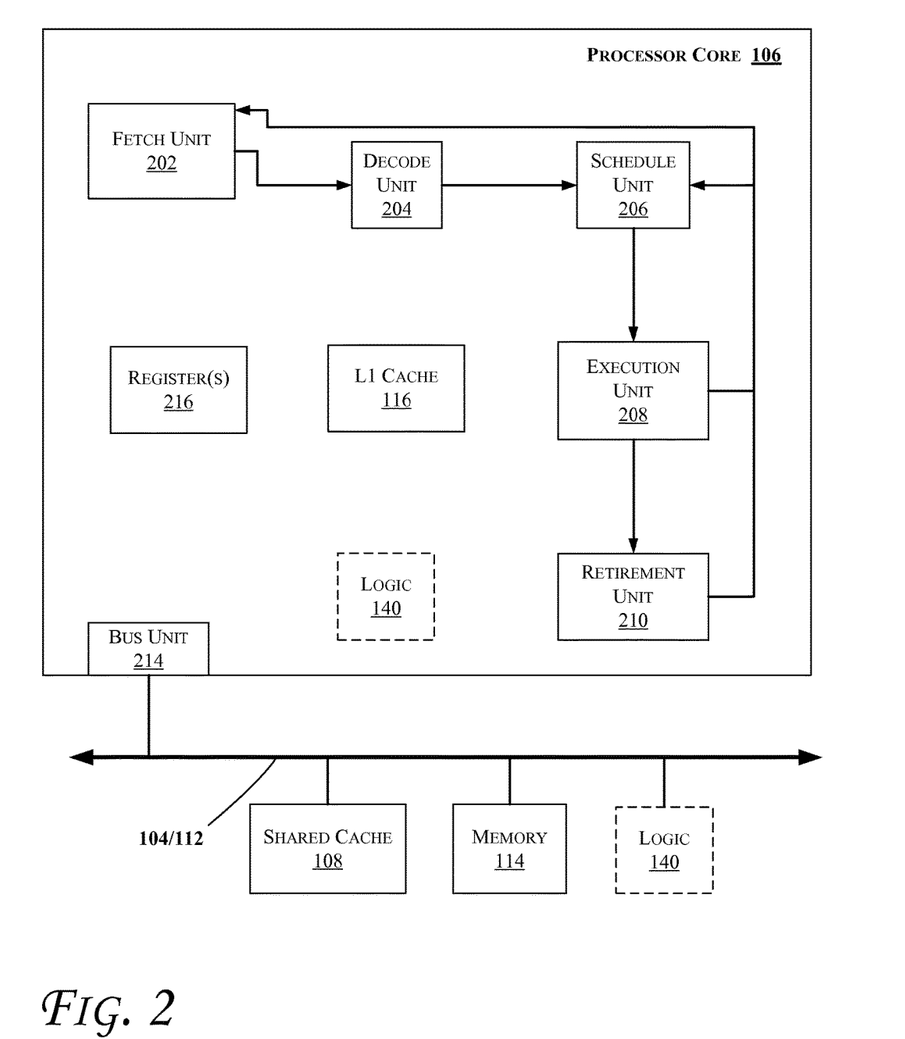
FIG. 2 illustrates a block diagram of portions of a processor core and other components of a computing system, according to an embodiment.

FIG. 2 illustrates a block diagram of portions of a processor core 106 and other components of a computing system, according to an embodiment. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 6-8. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit (such as an imaging computational unit, a graphics computational unit, a general-purpose computational unit, etc.). The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values related to assigned app priorities and/or sub-system states (modes) association.

Furthermore, even though FIG. 1 illustrates the logic 140 to be coupled to the core 106 via interconnect 112, in various embodiments logic 140 may be located elsewhere such as inside the core 106, coupled to the core via bus 104, etc.

Figure 3:
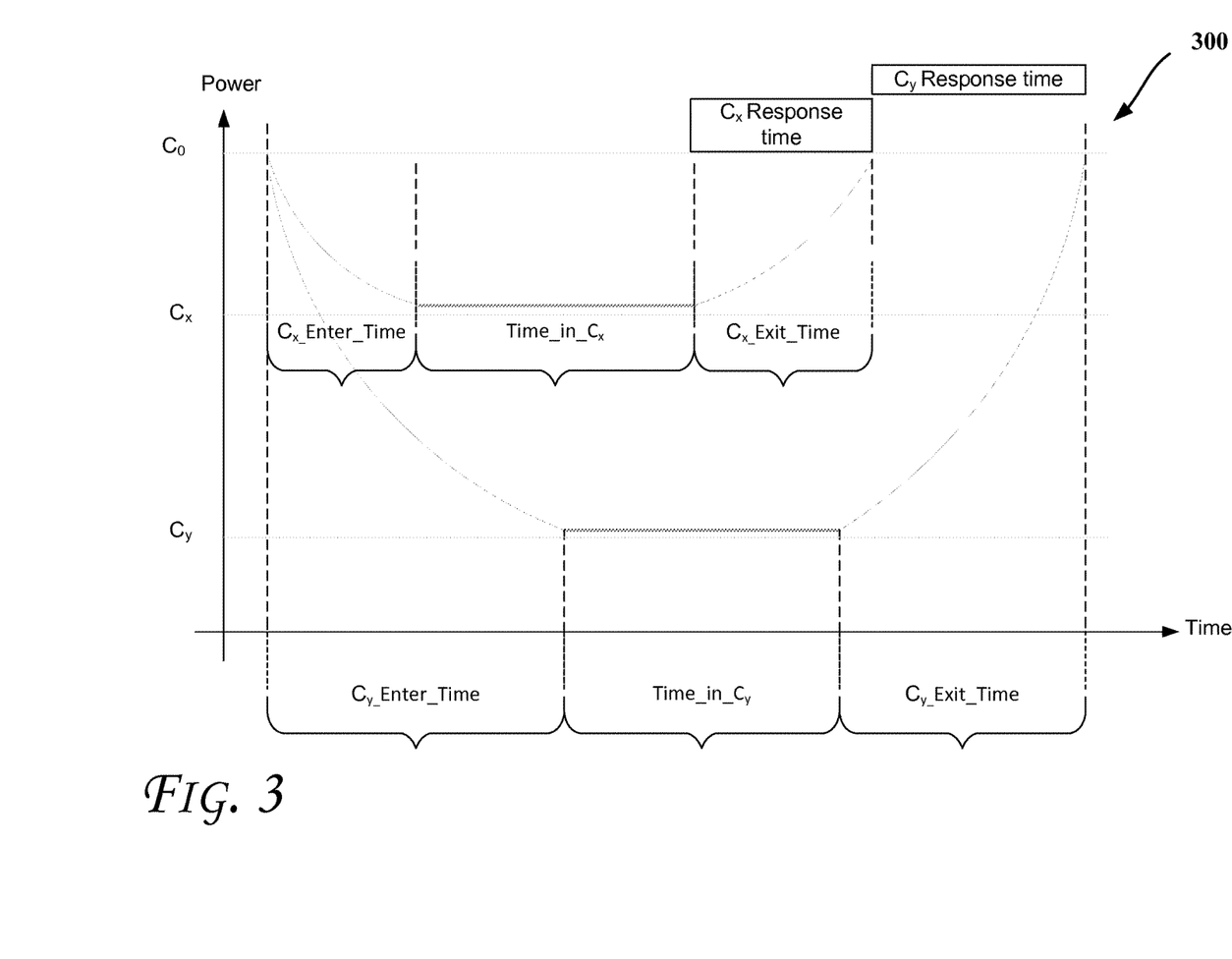
FIG. 3 illustrates parameters for the autonomous C state mechanism, according to an embodiment.

FIG. 3 illustrates parameters for the autonomous C state mechanism, according to an embodiment. More particularly, FIG. 3 shows sample power vs. time for three sample C states (i.e., C0, Cx, and Cy). As illustrated, as the amount of power consumption is decreased the entry time, residency, and exit times of C states increase.

Figure 4:
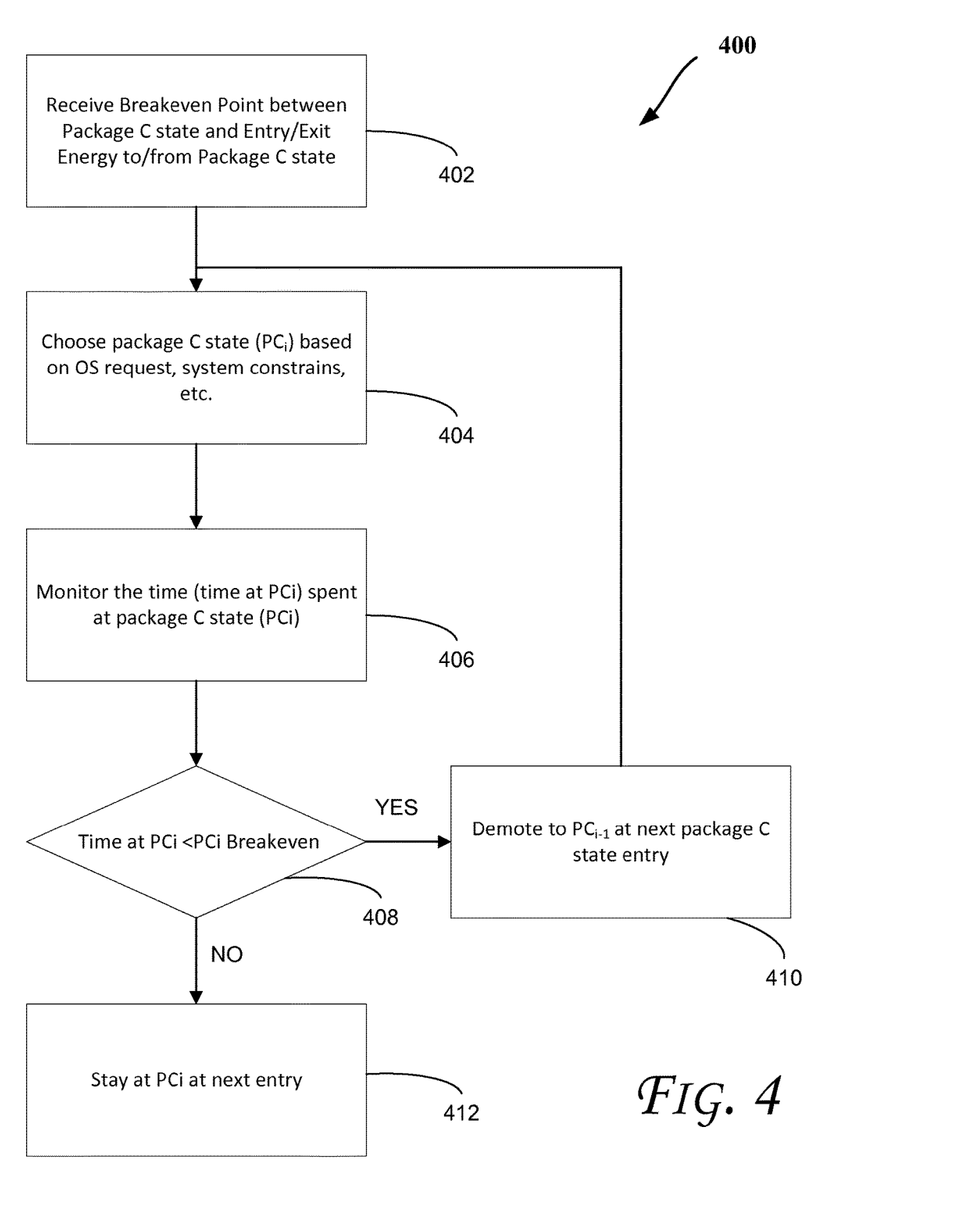
FIGS. 4-5 illustrate flow diagrams, according to some embodiments.

FIG. 4 illustrates a flow diagram of a method 400 for provision of an autonomous C state mechanism, according to an embodiment. In one embodiment, various components discussed with reference to FIGS. 1-3 (including for example logic 140, which may interchangeably be referred to herein as a Power Management Unit (PMU)) are utilized to perform one or more of the operations discussed with reference to FIG. 4.

In an embodiment, the requested package C state (e.g., by logic 140 and/or a PMU) is determined based on an OS (Operating System) request of core C state, the system/package device(s) latency tolerance, etc. At processor/CPU level, there are several package C states available (such as PC1 . . . PCn). In order to take energy benefit from entering into package C state PCi, the processor/CPU needs to reside in given C state enough time (e.g., >=breakeven point between PCi and PCi-1) to compensate for the energy overhead of entering and exiting a give power C state. For example, in cases that the package C state is to be maintained less time than a breakeven point, it is more energy efficient to demote to PCi-1 state instead.

By contrast, some implementations may be based on one parameter (e.g., the interrupt rate), and not by taking into account the energy consumed to enter and/or exit the package C state and how long that C state is maintained. Such an implementation is more heuristic based and in many cases is not accurate. However, some embodiments provide a more accurate calculation for the breakeven point between the package C states and accurately measure the time spent at the last package C state; hence, such embodiments provide a more accurate estimation of the energy benefit from last package C state entry and based on this determination cause to demote to a lower package C state in case of potential low or negative energy savings.

Referring to FIGS. 1-4, at operation 402, a breakeven point between package C state and enter/exit energy to/from package C state are received/input. An operation 404 chooses/selects a package C state PCi, e.g., based on an OS request of core C state, system constrains (such as the system devices latency tolerance), etc. At an operation 406, the length of time spent at package C state PCi of operation 404 is monitored. Operation 408 determines whether the time spent at PCi is less than the breakeven point for PCi. If so, an operation 410 demotes the package power state to PCi-1 at next package C state entry. Otherwise, an operation 412 causes residence in the same state PCi at the next package C state entry.

Figure 5:
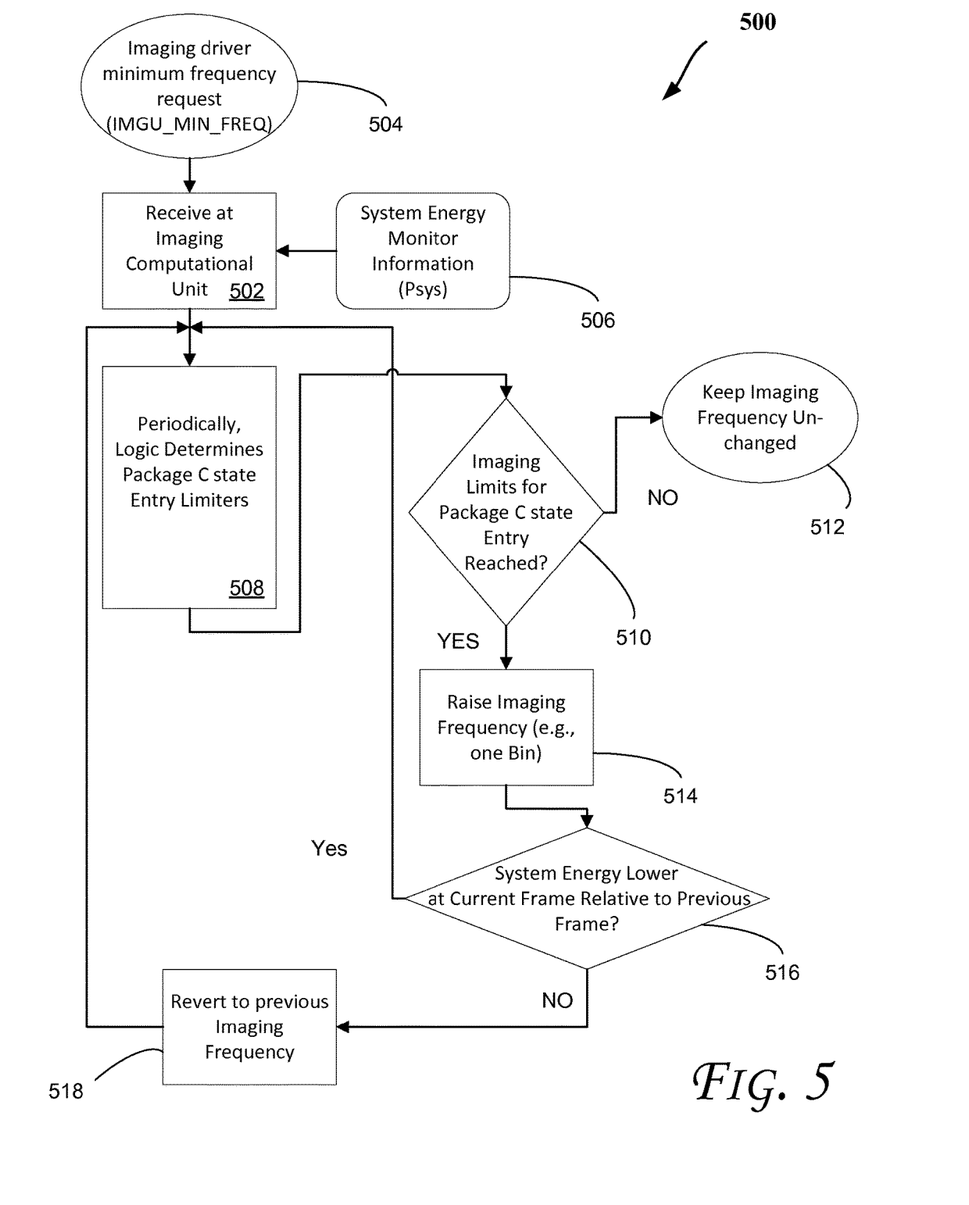

FIG. 5 illustrates a flow diagram of a method 500 to provide computational engine alignment, according to an embodiment. In one embodiment, various components discussed with reference to FIGS. 1-3 and 6-8 (including for example logic 140 and/or PMU) may be utilized to perform one or more of the operations discussed with reference to FIG. 5.

Referring to FIGS. 1-5, at operation 502, the imaging computational unit receives a minimum requested operating frequency from the imaging driver of an OS (504) and system energy information from a system monitor module (506). At an operation 508, logic (such logic 140 and/or PMU) determines package C State Entry limiter(s)/restriction(s) values, e.g., on a periodic basis (such as every 100 ms). At operation 510, it is determined whether an imaging limit for the package C state entry has been reached. If not, operation 512 maintains the same imaging operating frequency. Otherwise, at an operation 514, the imaging frequency is increased (e.g., by one frequency bin, per bin values determined by an Original Equipment Manufacturer (OEM) for example).

At operation 516, it is determined (e.g., by logic 14 and/or PMU) whether the system/package energy consumption is lower for the current time frame relative to a previous time frame under consideration. If true, method 500 resumes at operation 508; otherwise, method 500 continues at operation 518 to revert to previous imaging operating frequency. After operation 518, method 500 resumes at operation 508.

Accordingly, an embodiment raises the frequency of the Imaging computational unit in cases where the imaging computational unit is the package C state limiter. Moreover, an iterative mechanism may monitor the new system/package state to ensure that the system/package operates at the optimal frequency for the imaging computational unit. By contrast, previous solutions may just pick a frequency according to the driver request (for example, a minimal frequency value that is aimed at finishing the work during the frame), whereas at least one embodiment ensures that the imaging computational unit is operating at the optimal point system wise.

Figure 6:
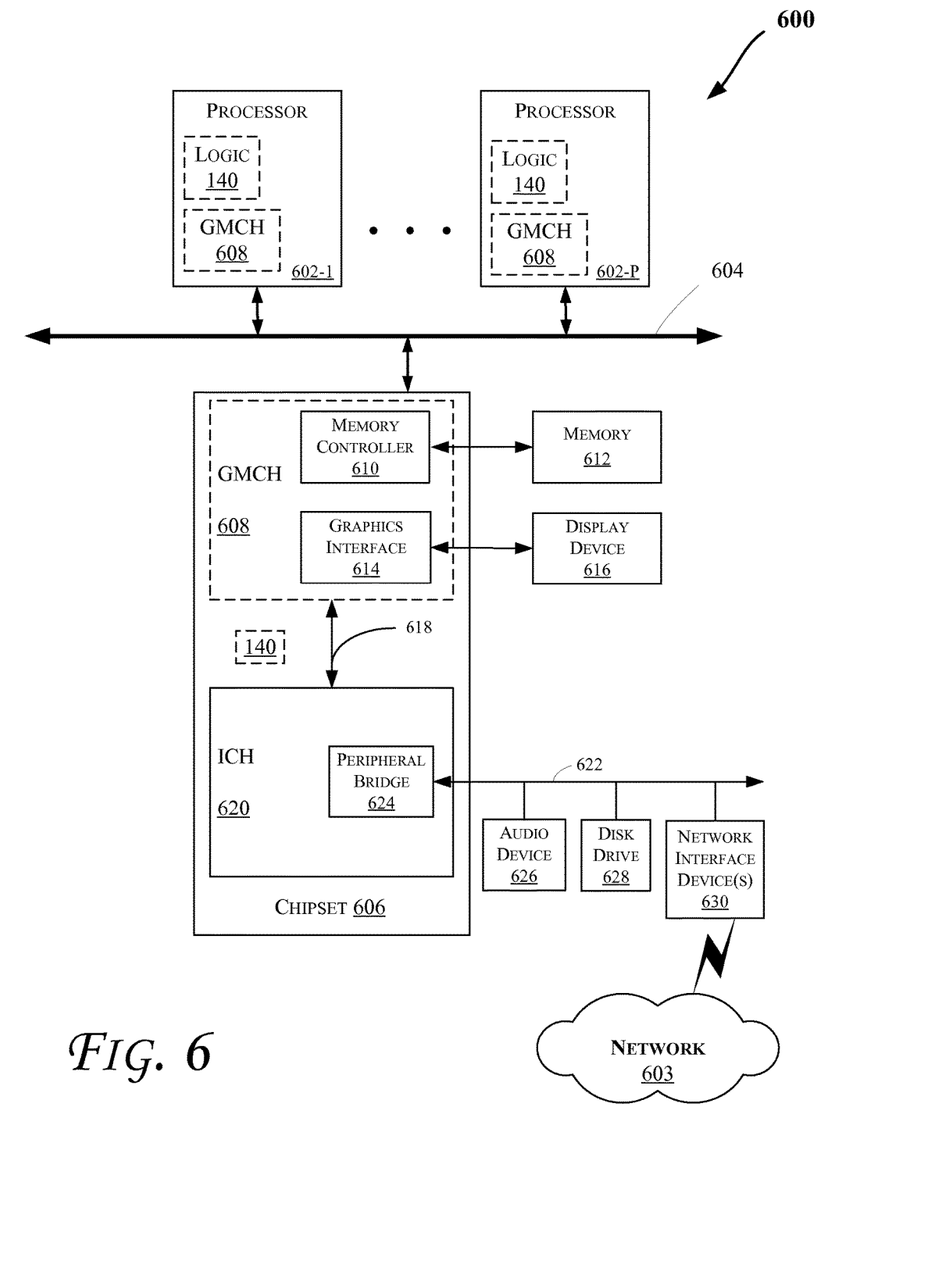

FIG. 6 illustrates a block diagram of a computing system 600 in accordance with an embodiment. The computing system 600 may include one or more central processing unit(s) (CPUs) or processors 602-1 through 602-P (which may be referred to herein as "processors 602" or "processor 602"). The processors 602 may communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)).

Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. In some embodiments, one or more of the processors 602 may include one or more of the cores 106, logic 140, a PMU, and sensor(s) 150, of FIG. 1. Also, the operations discussed with reference to FIGS. 1-5 may be performed by one or more components of the system 600. For example, logic 140 and/or a PMU may control C state entry/exit for processors 602 and/or a semiconductor package including one or more components of system 600.

A chipset 606 may also communicate with the interconnection network 604. The chipset 606 may include a graphics and memory control hub (GMCH) 608. The GMCH 608 may include a memory controller 610 that communicates with a memory 612. The memory 612 may store data, including sequences of instructions that are executed by the processor 602, or any other device included in the computing system 600. In one embodiment, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The GMCH 608 may also include a graphics interface 614 that communicates with a display device 616. In one embodiment, the graphics interface 614 may communicate with the display device 616 via an accelerated graphics port (AGP) or Peripheral Component Interconnect (PCI) (or PCI express (PCIe) interface). In an embodiment, the display 616 (such as a flat panel display, a cathode ray tube (CRT), a projection screen, etc.) may communicate with the graphics interface 614 through, for example, a signal converter that translates a digital representation of an image stored in a storage device such as video memory or system memory into display signals that are interpreted and displayed by the display device 618. The display signals produced may pass through various control devices before being interpreted by and subsequently displayed on the display device 450.

A hub interface 618 may allow the GMCH 608 and an input/output control hub (ICH) 620 to communicate. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and one or more network interface device(s) 630 (which is in communication with the computer network 603). Other devices may communicate via the bus 622. Also, various components (such as the network interface device 630) may communicate with the GMCH 608 in some embodiments. In addition, the processor 602 and the GMCH 608 may be combined to form a single chip. Furthermore, a graphics accelerator (e.g., AGP and/or PCI/PCIe graphics device) may be included within the GMCH 608 in other embodiments.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 600 may be arranged in a point-to-point (PtP) configuration. For example, processors, memory, and/or input/output devices may be interconnected by a number of point-to-point interfaces.

Figure 7:
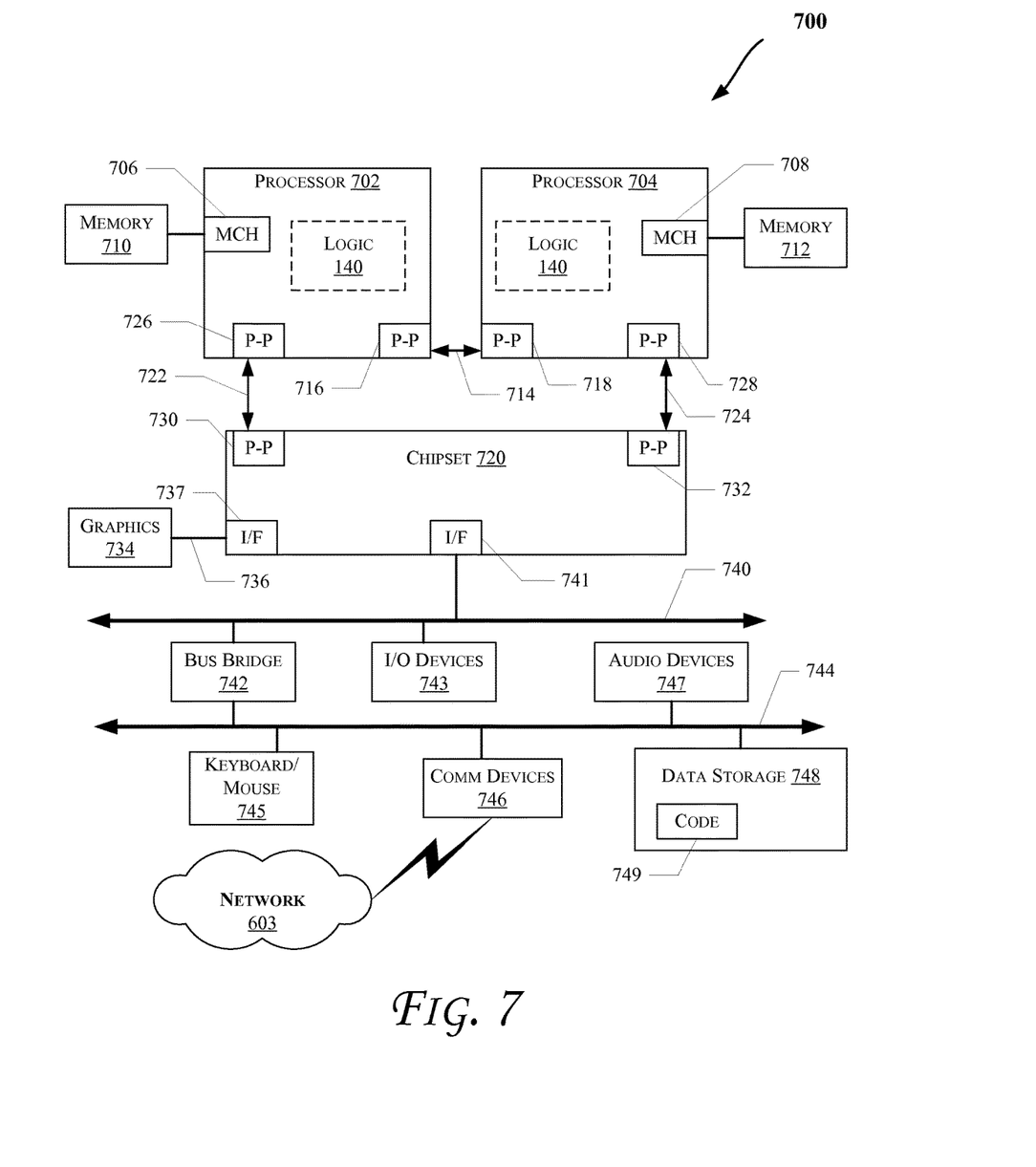

FIG. 7 illustrates a computing system 700 that is arranged in a point-to-point (PtP) configuration, according to an embodiment. In particular, FIG. 7 shows a system where processors, memory, and input/output devices are interconnected by a number of point-to-point interfaces. The operations discussed with reference to FIGS. 1-8 may be performed by one or more components of the system 700. For example, logic 140 and/or a PMU may control C state entry/exit for processors 702 and/or a semiconductor package including one or more components of system 7600.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6. Also, the processors 702 and 704 may include one or more of the cores 106, logic 140, a PMU, and/or sensor(s) 150 of FIG. 1.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

In at least one embodiment, one or more operations discussed with reference to FIGS. 1-7 may be performed by the processors 702 or 704 and/or other components of the system 700 such as those communicating via a bus 740. Other embodiments, however, may exist in other circuits, logic units, or devices within the system 700 of FIG. 7. Furthermore, some embodiments may be distributed throughout several circuits, logic units, or devices illustrated in FIG. 7.

Chipset 720 may communicate with the bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device, and/or a data storage device 748. The data storage device 748 may store code 749 that may be executed by the processors 702 and/or 704.

Figure 8:
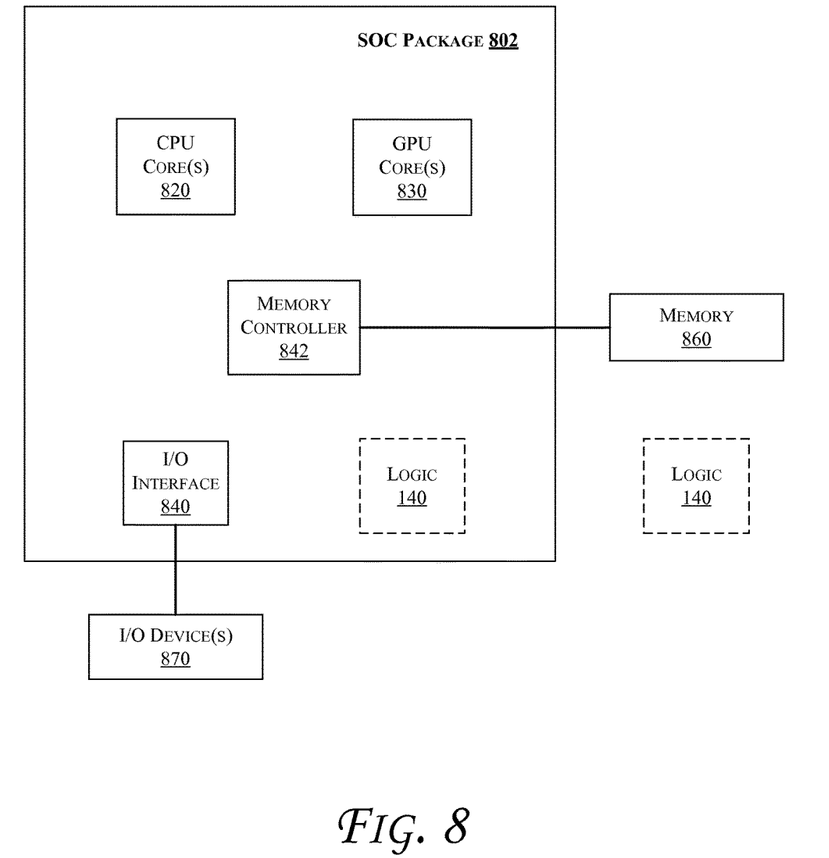

In some embodiments, one or more of the components discussed herein can be embodied as a System On Chip (SOC) device. FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 (which may be similar to or the same as memory discussed herein with reference to the other figures) via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like. Furthermore, SOC package 802 may include/integrate the logic 140 in an embodiment. Alternatively, the logic 140 may be provided outside of the SOC package 802 (i.e., as a discrete logic).

The following examples pertain to further embodiments. Example 1 includes an apparatus comprising: logic, at least a portion of which is in hardware, to determine whether a semiconductor package should enter a package C state based on energy consumption values for entry into and exit from the package C state, an amount of time the semiconductor package stayed in the package C state previously, and one or more breakeven time points between the various package C states. Example 2 includes the apparatus of example 1, comprising logic to calculate the energy consumption values for entry into and exit from the package C state. Example 3 includes the apparatus of example 1, comprising logic to detect a delay by an imaging computational unit of the semiconductor package to enter a low power consumption state relative to one or more other computational units of the semiconductor package. Example 4 includes the apparatus of example 3, wherein the logic to detect the delay is to cause the imaging computational unit to enter the low power consumption state in response to detection of the delay. Example 5 includes the apparatus of example 1, further comprising one or more sensors to detect variations in one or more of: temperature, operating frequency, operating voltage, power consumption, inter-core communication activity, processing unit status, or processing unit workload. Example 6 includes the apparatus of example 5, wherein the processing unit is to comprise a general-purpose processing unit, a graphics processing unit, and an imaging computational unit. Example 7 includes the apparatus of example 1, wherein the semiconductor package is to comprise a processor having one or more processor cores. Example 8 includes the apparatus of example 1, wherein one or more of: the logic, a processor having one or more processor cores, and memory are on a single integrated circuit. Example 9 includes the apparatus of 1, wherein a battery pack is to supply power to the logic.

Example 10 includes an apparatus comprising: logic, at least a portion of which is in hardware, to detect a delay by an imaging computational unit of a processor to enter a low power consumption state relative to one or more other computational units of the processor, wherein the logic is to cause the imaging computational unit to enter the low power consumption state in response to detection of the delay. Example 11 includes the apparatus of example 10, wherein the one or more other computational units of the processor are to comprise a general-purpose processing unit and a graphics processing unit. Example 12 includes the apparatus of example 10, comprising logic to determine whether a semiconductor package, which is to comprise the processor, should enter a package C state based on energy consumption values for entry into and exit from the package C state, an amount of time the semiconductor package stayed in the package C state previously, and one or more breakeven time points between the various package C states. Example 13 includes the apparatus of example 12, comprising logic to calculate the energy consumption values for entry into and exit from the package C state. Example 14 includes the apparatus of example 10, further comprising one or more sensors to detect variations in one or more of: temperature, operating frequency, operating voltage, power consumption, inter-core communication activity, processing unit status, or processing unit workload. Example 15 includes the apparatus of example 10, wherein the processor is to comprise one or more processor cores. Example 16 includes the apparatus of example 10, wherein one or more of: the logic, the processor having one or more processor cores, and memory are on a single integrated circuit. Example 17 includes the apparatus of example 10, wherein a battery pack is to supply power to the logic.

Example 18 includes a computer-readable medium comprising one or more instructions that when executed on a processor configure the processor to perform one or more operations to: determine whether a semiconductor package should enter a package C state based on energy consumption values for entry into and exit from the package C state, an amount of time the semiconductor package stayed in the package C state previously, and one or more breakeven time points between the various package C states. Example 19 includes the computer-readable medium of example 18, further comprising one or more instructions that when executed on the processor configure the processor to perform one or more operations to calculate the energy consumption values for entry into and exit from the package C state. Example 20 includes the computer-readable medium of example 18, further comprising one or more instructions that when executed on the processor configure the processor to perform one or more operations to detect a delay by an imaging computational unit of the semiconductor package to enter a low power consumption state relative to one or more other computational units of the semiconductor package. Example 21 includes the computer-readable medium of example 20, further comprising one or more instructions that when executed on the processor configure the processor to perform one or more operations to cause the imaging computational unit to enter the low power consumption state in response to detection of the delay.

Example 22 includes a computer-readable medium comprising one or more instructions that when executed on a processor configure the processor to perform one or more operations to: detect a delay by an imaging computational unit of the processor to enter a low power consumption state relative to one or more other computational units of the processor, wherein the imaging computational unit is to enter the low power consumption state in response to detection of the delay. Example 23 includes the computer-readable medium of example 22, wherein the one or more other computational units of the processor are to comprise a general-purpose processing unit and a graphics processing unit. Example 24 includes the computer-readable medium of example 22, further comprising one or more instructions that when executed on the processor configure the processor to perform one or more operations to determine whether a semiconductor package, which is to comprise the processor, should enter a package C state based on energy consumption values for entry into and exit from the package C state, an amount of time the semiconductor package stayed in the package C state previously, and one or more breakeven time points between the various package C states. Example 25 includes the computer-readable medium of example 24, further comprising one or more instructions that when executed on the processor configure the processor to perform one or more operations to calculate the energy consumption values for entry into and exit from the package C state.

Example 26 includes a method comprising: determining whether a semiconductor package should enter a package C state based on energy consumption values for entry into and exit from the package C state, an amount of time the semiconductor package stayed in the package C state previously, and one or more breakeven time points between the various package C states. Example 27 includes the method of example 26, further comprising calculating the energy consumption values for entry into and exit from the package C state. Example 28 includes the method of example 26, further comprising detecting a delay by an imaging computational unit of the semiconductor package to enter a low power consumption state relative to one or more other computational units of the semiconductor package. Example 29 includes the method of example 28, further comprising causing the imaging computational unit to enter the low power consumption state in response to detection of the delay. Example 30 includes the method of example 26, further comprising one or more sensors detecting variations in one or more of: temperature, operating frequency, operating voltage, power consumption, inter-core communication activity, processing unit status, or processing unit workload. Example 31 includes the method of example 26, further comprising supply power from a battery pack.

Example 32 includes a method comprising: detecting a delay by an imaging computational unit of a processor to enter a low power consumption state relative to one or more other computational units of the processor, wherein the imaging computational unit enters the low power consumption state in response to detection of the delay. Example 33 includes the method of example 32, further comprising determining whether a semiconductor package, which is to comprise the processor, should enter a package C state based on energy consumption values for entry into and exit from the package C state, an amount of time the semiconductor package stayed in the package C state previously, and one or more breakeven time points between the various package C states. Example 34 includes the method of example 33, further comprising calculating the energy consumption values for entry into and exit from the package C state. Example 35 includes the method of example 32, further comprising one or more sensors detecting variations in one or more of: temperature, operating frequency, operating voltage, power consumption, inter-core communication activity, processing unit status, or processing unit workload. Example 36 includes the method of example 32, further comprising supplying power from a battery pack.

Example 37 includes an apparatus comprising means to perform a method as set forth in any preceding example.

Example 38 includes a machine-readable storage including machine-readable instructions, when executed, to implement a method or realize an apparatus as set forth in any preceding example.

In various embodiments, the operations discussed herein, e.g., with reference to FIGS. 1-8, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-8.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
logic, at least a portion of which is in hardware, to determine whether a semiconductor package should enter a package C state based on energy consumption values for entry into and exit from the package C state, an amount of time the semiconductor package stayed in the package C state previously, and one or more breakeven time points between the various package C states, wherein an imaging computational unit of the semiconductor package is to operate at a first frequency that is higher than a second frequency, wherein the second frequency is to be indicated by an imaging driver of an operating system, wherein the imaging computational unit is to operate at a higher frequency to enter a low power consumption state in response to detection of a delay by the imaging computational unit of the semiconductor package to enter the low power consumption state relative to one or more other computational units of the semiconductor package, wherein the semiconductor package is to remain in its current state based at least in part on comparison of a monitored time spent at the package C state and at least one of the one or more breakeven time points.

2. The apparatus of claim 1, comprising logic to calculate the energy consumption values for entry into and exit from the package C state.

3. The apparatus of claim 1, further comprising one or more sensors to detect variations in one or more of: temperature, operating frequency, operating voltage, power consumption, inter-core communication activity, processing unit status, or processing unit workload.

4. The apparatus of claim 3, wherein the processing unit is to comprise a general-purpose processing unit, a graphics processing unit, and the imaging computational unit.

5. The apparatus of claim 1, wherein the semiconductor package is to comprise a processor having one or more processor cores.

6. The apparatus of claim 1, wherein one or more of: the logic, a processor having one or more processor cores, and memory are on a single integrated circuit.

7. The apparatus of claim 1, wherein a battery pack is to supply power to the logic.

8. An apparatus comprising:
logic, at least a portion of which is in hardware, to detect a delay by an imaging computational unit of a processor to enter a low power consumption state relative to one or more other computational units of the processor, wherein the logic is to cause the imaging computational unit to operate at a higher frequency to enter the low power consumption state in response to detection of the delay, wherein the imaging computational unit of the processor is to operate at a first frequency that is higher than a second frequency, wherein the second frequency is to be indicated by an imaging driver of an operating system, wherein a semiconductor package that comprises the processor is to remain in its current state based at least in part on comparison of a monitored time spent at the package C state and at least one of the one or more breakeven time points.

9. The apparatus of claim 8, wherein the one or more other computational units of the processor are to comprise a general-purpose processing unit and a graphics processing unit.

10. The apparatus of claim 8, comprising logic to determine whether the semiconductor package, should enter a package C state based on energy consumption values for entry into and exit from the package C state, an amount of time the semiconductor package stayed in the package C state previously, and one or more breakeven time points between the various package C states.

11. The apparatus of claim 10, comprising logic to calculate the energy consumption values for entry into and exit from the package C state.

12. The apparatus of claim 10, further comprising one or more sensors to detect variations in one or more of: temperature, operating frequency, operating voltage, power consumption, inter-core communication activity, processing unit status, or processing unit workload.

13. The apparatus of claim 8, wherein the processor is to comprise one or more processor cores.

14. The apparatus of claim 8, wherein one or more of: the logic, the processor having one or more processor cores, and memory are on a single integrated circuit.

15. The apparatus of claim 8, wherein a battery pack is to supply power to the logic.

16. A non-transitory computer-readable medium comprising one or more instructions that when executed on a processor configure the processor to perform one or more operations to:
determine whether a semiconductor package should enter a package C state based on energy consumption values for entry into and exit from the package C state, an amount of time the semiconductor package stayed in the package C state previously, and one or more breakeven time points between the various package C states, wherein an imaging computational unit of the semiconductor package is to operate at a first frequency that is higher than a second frequency, wherein the second frequency is to be indicated by an imaging driver of an operating system, wherein the imaging computational unit is to operate at a higher frequency to enter a low power consumption state in response to detection of a delay by the imaging computational unit of the semiconductor package to enter the low power consumption state relative to one or more other computational units of the semiconductor package, wherein the semiconductor package is to remain in its current state based at least in part on comparison of a monitored time spent at the package C state and at least one of the one or more breakeven time points.

17. The computer-readable medium of claim 16, further comprising one or more instructions that when executed on the processor configure the processor to perform one or more operations to calculate the energy consumption values for entry into and exit from the package C state.

18. A non-transitory computer-readable medium comprising one or more instructions that when executed on a processor configure the processor to perform one or more operations to:
detect a delay by an imaging computational unit of the processor to enter a low power consumption state relative to one or more other computational units of the processor, wherein the imaging computational unit is to operate at a higher frequency to enter the low power consumption state in response to detection of the delay, wherein the imaging computational unit of the semiconductor package is to operate at a first frequency that is higher than a second frequency, wherein the second frequency is to be indicated by an imaging driver of an operating system, wherein a semiconductor package that comprises the processor is to remain in its current state based at least in part on comparison of a monitored time spent at the package C state and at least one of the one or more breakeven time points.

19. The computer-readable medium of claim 18, wherein the one or more other computational units of the processor are to comprise a general-purpose processing unit and a graphics processing unit.

20. The computer-readable medium of claim 18, further comprising one or more instructions that when executed on the processor configure the processor to perform one or more operations to determine whether a semiconductor package, which is to comprise the processor, should enter a package C state based on energy consumption values for entry into and exit from the package C state, an amount of time the semiconductor package stayed in the package C state previously, and one or more breakeven time points between the various package C states.

21. The computer-readable medium of claim 20, further comprising one or more instructions that when executed on the processor configure the processor to perform one or more operations to calculate the energy consumption values for entry into and exit from the package C state.

22. The apparatus of claim 1, wherein a length of time spent at the package C state is to be monitored.

* * * * *